Sept. 15, 1931.  K. E. PEILER  1,823,123
TWO-TABLE GLASS FORMING MACHINE
Filed Jan. 18, 1929    2 Sheets-Sheet 1
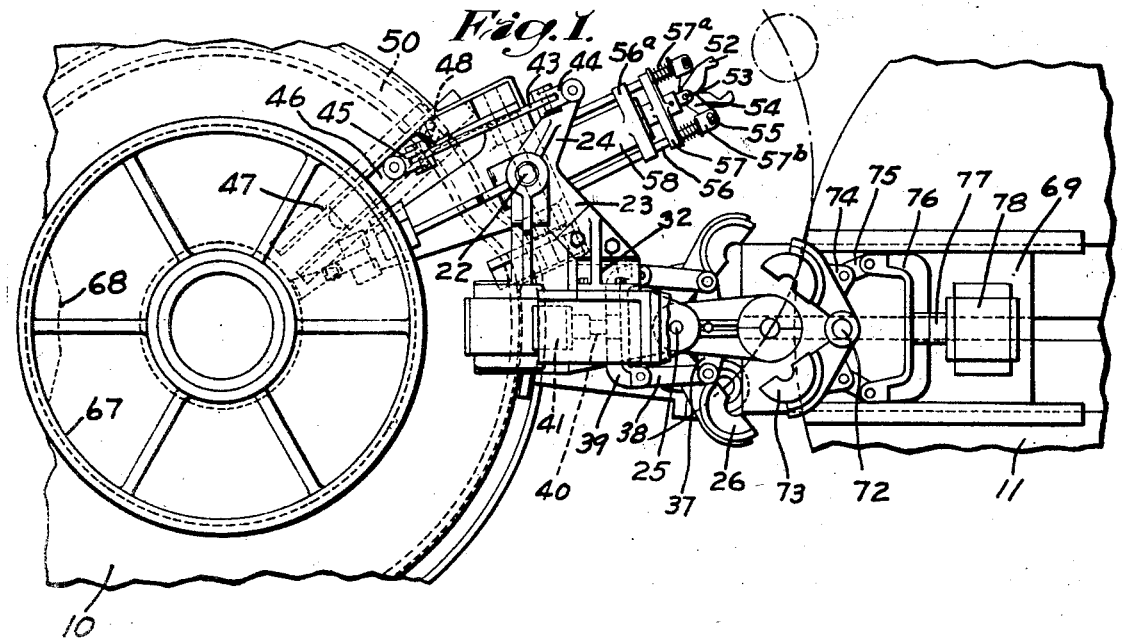
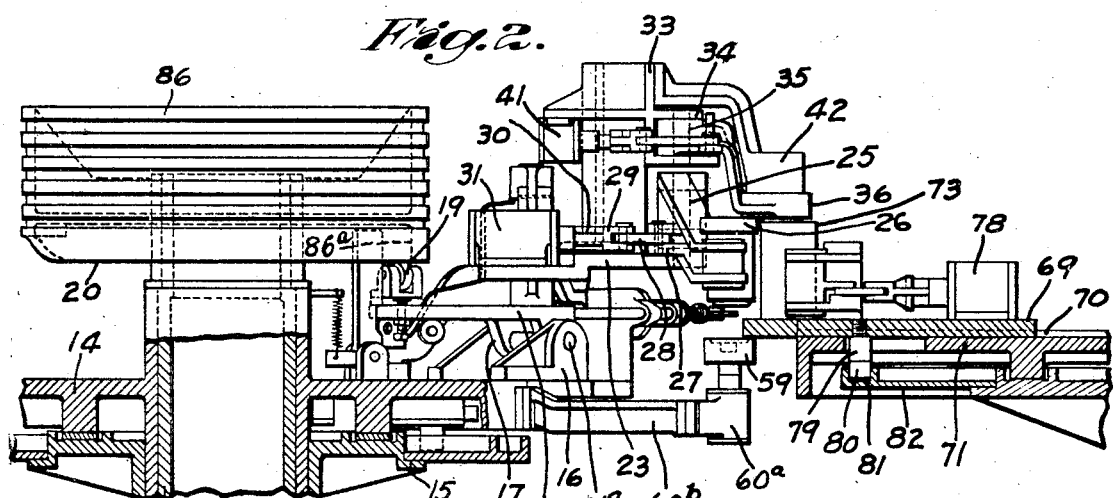
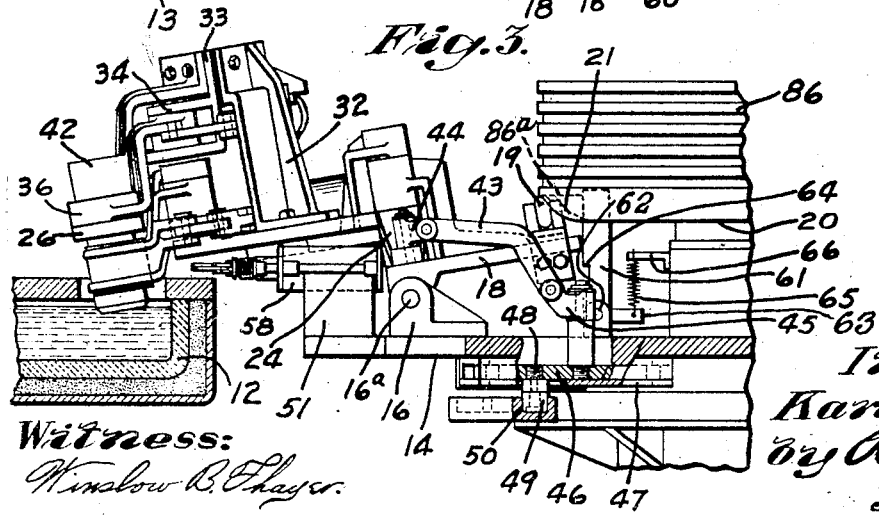
Witness: Winslow B. Thayer.
Inventor: Karl E. Peiler
by Robert A. Burr
Attorney Sept. 15, 1931.　　　　K. E. PEILER　　　　1,823,123
TWO-TABLE GLASS FORMING MACHINE
Filed Jan. 18, 1929　　2 Sheets-Sheet 2
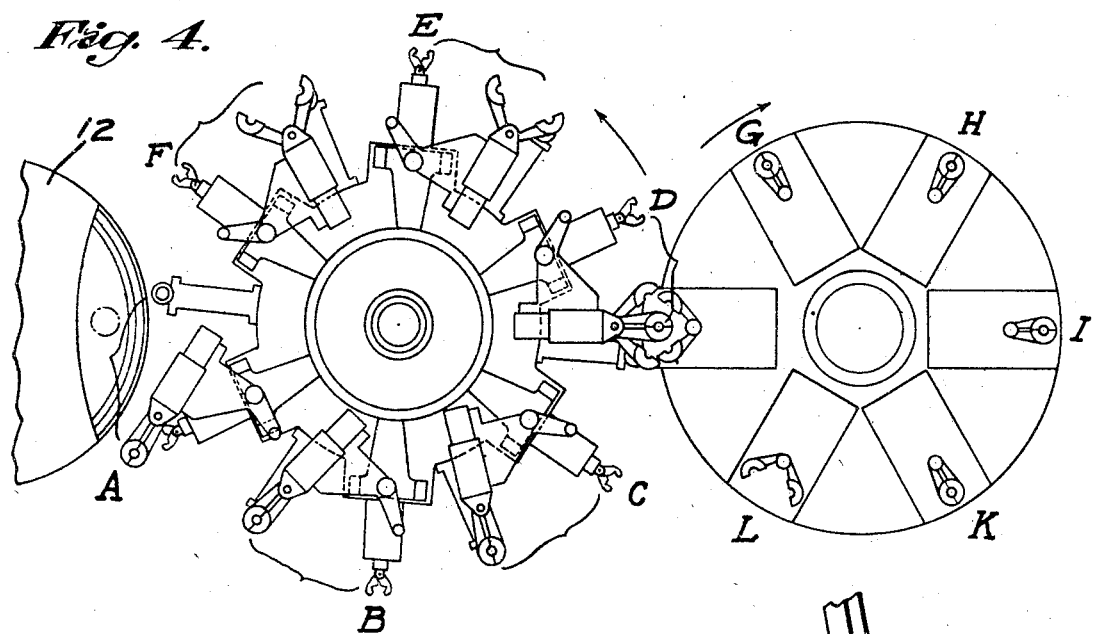
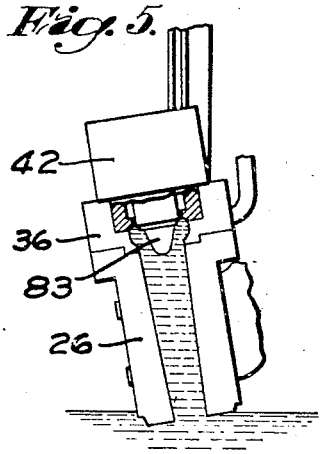
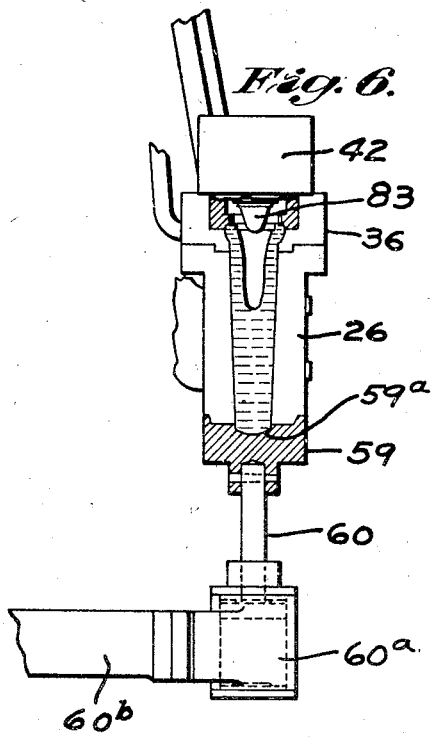
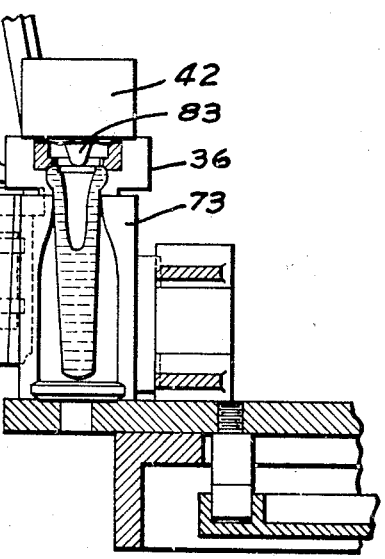
Witness:
Winslow B. Thayer
Inventor:
Karl E. Peiler,
by Robert D. Bown
Attorney Patented Sept. 15, 1931

1,823,123

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

TWO TABLE GLASS FORMING MACHINE

Application filed January 18, 1929. Serial No. 333,306.

My invention relates to apparatus for fabricating hollow glassware, particularly bottles.

The device of my invention comprises certain features similar to those embodied in the machine disclosed in the United States Patent No. 1,020,222 to Alvin S. Reichel, as to which machine my invention constitutes an improvement. The present invention also comprises features similar to those disclosed in my prior United States applications, Serial No. 87,800, filed February 12, 1926 and Serial No. 323,954, filed December 5, 1928. As to such similar matter, this application constitutes a continuation in part of the aforesaid earlier application.

Prior to my invention, continuously rotating suction gathering bottle machines have been confined to the single table type, such as that shown in the aforesaid patent to Reichel, in which the mechanisms for gathering, and forming the parison, as well as the mechanisms for blowing the parison to final form, are carried upon a single table or spider. Certain advantages result in the manufacture of bottles, from the use of forming machines of the two-table type, that is, machines in which the parison collecting and forming mechanisms are mounted upon one table, rotating around its own center, while the finish blowing mechanisms, including the blow molds, are mounted on an adjacent rotating table which revolves about a different center. Heretofore, because of the difficulties involved in transferring the parisons from the parison mold table to the blow mold table during the rotation of the tables, forming machines of the two-table type have generally been of the intermittent type, which type permits the transfer while the tables are stationary, and this has been the case in spite of the fact that it is advantageous to operate a glass forming machine by continuous rotation of the tables.

Also prior to my invention, suction gathering bottle machines have failed to provide a positive formation of the entire parison by mold surfaces, as distinguished from the formation incident to the sucking and shearing operations. To produce parisons of the best character, which will result, when blown to final form, in superior articles, it is important that the glass be forced into intimate contact with complete mold surfaces during the parison forming operation.

An object of the invention is to provide a two-table continuously rotating bottle forming machine adapted to automatically collect its charges of glass by the suction method from a gathering pool, to sever the collected charges from the glass in the pool, to form these severed charges into parisons of definite external shape in parison molds mounted on one table or spider, to transfer the parisons so formed to suitable blow molds upon a second table, which revolves continuously about an axis other than the axis of the parison mold table and to blow the parisons to final form in such blow molds.

A further object of my invention is to provide apparatus for positively forming the glass gathered in a suction mold into a parison, by forcing the glass into intimate contact with a completed mold surface.

A further object of the invention is to provide novel mounting and operating means for the parison mold, by which it may be moved to a plurality of positions relative to its table or spider to perform the various operations of gathering a charge, forming the parison and transferring the parison.

A further object of the invention is to provide an improved suction gathering and charge severing means.

Another object is to provide a novel apparatus for gathering charges by suction forming parisons and transferring the parisons to the blow molds.

Further specific objects and advantages of my invention will appear from the following specification when considered in connection with the accompanying drawings, in which:

Figure 1 is a fragmentary plan view of a two-table, suction gathering, bottle forming machine embodying my invention;

Fig. 2 is a view partly in section and partly in elevation of the apparatus shown in Fig. 1;

Fig. 3 is a view in elevation and partly in section of one of the parison mold units in gathering position;

Fig. 4 is a diagrammatic plan view of my novel two-table machine and associated gathering pot illustrating the preferred cycle of operation and the character of movements between different points in the cycle;

Fig. 5 is an enlarged view of the parison mold, neck ring and suction and blow head in the gathering position, the mold and neck ring being shown in section to illustrate the relationship of certain of the parts during the gathering operation;

Fig. 6 is a view showing the relationship of the parison mold, neck ring, suction and blow head and the bottom plate during the parison forming or counterblowing operation; and Fig. 7 is a view showing the relationship of the parison mold, neck ring, suction and blow head and blow mold during the transfer operation.

Certain features commonly provided and necessary to the complete operation of a bottle forming machine have been omitted from the drawings for the sake of clearness. For instance, the means for applying blowing pressure in the blow mold has not been illustrated, as this feature is old in the art and may readily be supplied in a number of well-known forms.

Geenrally speaking, I provide a constantly rotating table or spider, upon which is mounted a plurality of similar units, each comprising a suction parison mold, a neck ring and a suitable suction and pressure head. I also preferably provide a separate pair of glass severing shears, as a part of each unit. Each unit is supplied with actuating mechanism to open and close the mold and neck ring and to apply suction through the mold to gather the glass therein and to apply blowing pressure therethrough to form the parisons. Each unit also includes a mold completing bottom plate or mold section and suitable mechanism for dipping the suction gathering molds into a bath of glass at the proper period in its rotation, for then moving it over the bottom plate, at which position the parison is formed and for thereafter moving the neck ring and formed parison into suitable position to transfer the parison to the associated blow mold. The blow molds are mounted upon a table or spider other than that upon which the suction parison molds are mounted, and this table is adapted to rotate about its center which is spaced from, but adjacent to the parison mold table. The blow mold table carries a plurality of similar units, each of which comprises a suitable blow mold, mechanism for opening and closing the molds and means for blowing the parison to final form in the blow mold. The blow molds are mounted in such a way as to permit their movement radially of the blow mold table to cause each blow mold to follow a path concentric with that of its associated neck ring for a selected portion of its rotation to effect the transfer of the parison from the neck ring to the blow mold.

Certain of the movements of the mechanism mounted on both of the tables are accomplished through suitable pneumatic means, while others are accomplished by co-operating stationary cams and moving cam rolls. The application of compressed air to the pneumatic units is also preferably controlled by stationary cams.

Referring to the drawings, 10 represents the parison mold table and 11 the associated blow mold table. 12 represents a suitable container or pot for the glass supply into which the suction molds are dipped and from which the charges are collected.

The suction mold table 10 comprises a suitable base (not shown) from which arises a stationary hollow column 13 about which the moving parts rotate and within which suitable provisions may be made for a supply of air and the application of vacuum. The details of the air and vacuum supply means are not shown, as they are well known. They may be similar to those disclosed in the aforesaid patent to Reichel. Mounted for rotation about the column 13 is a continuously rotating table 14 to which movement may be imparted by any suitable means (not shown), but which are common in the art and may be similar to that shown in the Reichel patent aforesaid. Adjacent to the table 14, I provide suitable stationary structure, as 15 and 86, having cams coacting with suitable rollers on the moving parts of the parison mold units hereinafter described. The structure 86 has slots formed therein as indicated at 86a for receiving cams (not shown) which operate suitable valves (not shown) which may be mounted on the table 14, for controlling the several pneumatically operated devices which operate the neck mold, the parison body mold, the shears, and the bottom plate, as hereinafter explained. Such cams and valves and the operation thereof are well known in the art and hence need not be illustrated; those shown in the patent to LaFrance 1,348,365, granted Aug. 3, 1920 may, for example, be employed.

The parison mold units are mounted upon the table 14. These units are identical, hence but one is shown and will be described. A pair of spaced brackets 16 arise from the table 14 and provide bearings for a pivot shaft 16a. A pair of lugs 17 depending from a suitable plate or carrier 18 are pivoted on the shaft 16a, so that the center of mass of the plate and parts carried therein is beyond the pivot and away from the center of the table 14. Thus there is a tendency for the plate 18 and the parison mold mechanism carried thereby to tilt, as shown in Fig. 3. The plate 18 extends rearwardly beneath the cam structure 86 and carries an upwardly projecting cam roller 19 which runs on the cam track 20 on the underside of the structure 86. Thus the tilting of the plate 18 from the horizontal may be controlled by the cam 20. Save when it is desired to dip the mold into the glass, the plate 18 is carried in the horizontal position. The cam 20 is formed in such a manner that as the mechanism approaches the gathering station, the cam roller 19 moves upwardly along an incline 21 and permits the dipping of the mold into the glass. When the glass has been collected, the cam roll follows a downwardly sloping portion of the cam, and the plate is lifted again to the horizontal position.

To reduce the wear upon the roll 19, I may provide a latch mechanism comprising an L-shaped member 61 pivoted as at 62 on a bracket 63 arising from the table 14. The vertical arm of the member 61 is provided with a notch or shouldered portion 64 adapted to receive the rearward extension of the plate 18 when that plate is in horizontal position. The other arm of the member 61 is connected with a spring 65 attached to a bracket 66 to urge the vertical arm into contact with the end of the plate 18. The upper end of the vertical arm travels in contact with an interior cam surface 67 on the cam structure 86. When it is desired to dip the head into the glass for the gathering operation, the vertical arm comes into contact with the cam portion 68 which forces it inwardly or to the right, as shown in Fig. 3 and releases the plate 18 from the latch.

The plate 18 carries a vertically disposed pivot post 22, preferably located above the pivot 16a, upon which an arm or plate 23 is mounted for rotation in a horizontal plane. The arm 23 carries a crank arm or extension 24 through which the arm is moved about the post 22, as hereinafter described.

A pivot post 25 arises from the outer portion of the plate 23 and serves as a pivot for the halves 26 of the body parison mold, the holders for which are provided with suitable ears 27 which are pivotally connected to links 28, the opposite ends of which are pivoted to a cross-arm or yoke 29 which in turn is attached to the piston rod 30 of a piston operating in a fluid pressure cylinder 31. The cylinder 31 is provided with suitable connections (not shown) for the admission and exhaust of air to effect the opening and closing of the parison body mold halves 26 at suitable times.

Also arising from the plate 23 is a bracket 32 to which is bolted a second bracket 33, having a bifurcated portion 34 carrying a stud shaft 35, which serves as a pivot for the halves 36 of a divided neck ring. The carriers for the halves 36 are provided with suitable ears 37 pivoted to links 38 which in turn are pivoted to the cross-arm 39. This cross-arm is attached to a piston rod 40 of a piston operating in a suitable cylinder 41. A suitable mechanism for applying and exhausting compressed air to and from the cylinder 41 (not shown) is provided to open and close the neck ring at suitable times. It is intended that in the present structure, the exhaust and admission of air from the cylinders 41 and 31 be under the control of suitable valve mechanisms, which are opened and closed by stationary cams on the non-rotating portion of the parison mold table 10.

On the bracket 33, and above the bifurcated portion 34, there is mounted a combined suction and blow head adapted to cooperate at suitable times with the neck ring and body mold to apply suction within the parison mold to gather glass therein, and at other times to supply blowing air to form the parison. The details of this head 42 are not shown. The head and its connections may be of any suitable construction, such for instance, as that shown in the United States patent to Owens, No. 766,768, or in my prior application Serial No. 316,982, filed November 3, 1928.

Movement of the plate 23 and the parts carried thereby about the pivot 22 is accomplished through the following mechanism. To the outer end of the crank arm 24 is attached a suitable strap or connecting rod 43, the connection being universal in character as is shown at 44. The other end of this strap 43 is similarly connected by a universal connection 45 to a slide plate 46 which is mounted to slide in suitable slideways 47 on the table 14. The plate 46 carries a downwardly depending stud shaft 48 carrying a cam roll 49 adapted to run in a cam groove 50 in the stationary cam structure 15. The contour of the cam groove is such that it causes, upon rotation of the table 14, a suitable sliding and positioning movement of the plate 46, which in turn imparts movement through the crank 24 to the plate 26 to position the mold, neck ring and the head 42 successively in the gathering, parison forming and transfer positions.

I preferably supply a shearing mechanism with each of the units, but if desired, a single such mechanism cooperating with all of the units may be provided as shown in my copending application, Ser. No. 337,941, filed Feb. 6, 1929. As best shown in Figs. 1 and 3, the shears are carried upon a bracket 51 rising from the table 14, and comprise a pair of cooperating blades 52 pivoted as at 53 to the ends of a pair of links 54, the opposite ends of which are pivoted in slots 55 in the ends of a pair of rods 56. The pivot 53 is connected to a cross-arm 57 which is mounted for sliding movement on the arms 56. The arms 56 are mounted in suitable fixed guide ways 56a and a pair of coiled springs 57a surround the rods 56 between stops 57b and cross-arm 57. The cross-arm 57 is connected with the piston rod of a piston working in a pneumatic cylinder 58. When the piston rod is moved outwardly (to the right in Fig. 1), it first causes an outward projection of the rods 56 until such movement is arrested by suitable stops (not shown) on the rods. The continued movement of the piston rod causes the cross-arm 57 to move on the rods 56 and to effect a closure of the blades 52 to sever the glass. Supply and exhaust of air at suitable times to the cylinder 58 is controlled by suitable mechanism (not shown), but preferably actuated by the rotation of the table to project and close the blades to sever a charge collected in the parison mold from the glass of the supply.

A bottom mold or plate 59, provided with a suitable cavity 59a adapted to complete the parison mold and to impart the correct shape to the lower portion of the parison, is mounted upon a piston rod 60 of a piston mounted for vertical reciprocation in a cylinder 60a. The cylinder 60a is supported by a bracket 60b on the table 14 in a suitable position below the arc of the parison mold described about the pivot 22. Suitable means (not shown) are provided to move the bottom plate into capping relation with the parison mold during the parison forming operation, which takes place when the mold is moved to a position directly above the bottom plate.

The blow mold table 11, as stated, carries a plurality of blow mold units, each adapted to cooperate at one of the parison mold units heretofore described. Each of these units comprises a plate 69, mounted for sliding movement in slideways 70 upon the rotating table 71. This slide carries a suitable pivot post 72 which acts as a pivot for the halves 73 of the divided blow mold. The carriers for the blow mold halves are provided with ears 74, pivoted to links 75 which in turn are pivoted to a cross-head 76 attached to the piston rod 77 of a pneumatic piston operating in a cylinder 78. The cylinder is provided with suitable means for applying and exhausting compressed air thereto (not shown) to open and close the blow mold at suitable times. Such means may comprise a valve operated by a cam on the column of the table as shown in my copending application 323,954, filed Dec. 5, 1928 previously referred to. The plate 69 carries a depending stud shaft 79 which passes through a slot in the table 71 and upon which is mounted a cam roller 80 adapted to run in a cam path 81 formed in the stationary portion 82 of the blow mold table 11. The cam path 81 is so formed as to cause the blow mold to move to a position in which its center line coincides with the center line passing through the neck ring when the neck ring is in transfer position and to thereafter cause the blow mold to move radially of the table 71 and to follow a path of rotation directly below that of the neck ring during the time necessary to effect the closing of the blow mold and the opening of the neck ring to accomplish the transfer of a parison to the blow mold.

The mold table is also provided with suitable means (not shown) for applying compressed air at suitable times to the blow mold to blow the parison received therein to final form.

The cam path 50, which controls the swinging and positioning movement of the parison mold and associated parts about the pivot 22, may be formed to give any desired sequence or type of operations, but I prefer to so shape it as to provide the sequency of operations shown diagrammatically in Fig. 4.

In Fig. 4 the letters A to F inclusive indicate the successive points in the path of the parison mold units. In a number of these positions, the location of the parison mold appears somewhat displaced from the position indicated by the letter, which in each instance is taken through the pivot 22 about which the parison head turns. For clearness of illustration the line indicated by the letter is joined by a bracket to the showing of the parison mold associated with the particular pivot pin 22. It is, of course, understood that the positions indicated by the letters are not positions at which the unit is halted, as the rotation of the table is continuous. Beginning at a position indicated at A the gathering operation has just been concluded, the mold, neck ring and suction and blow head being in the same relative positions they occupy during gathering, the shears having operated and withdrawn and the plate 18 having been returned to the horizontal position. At this point, the roller 49 is traveling on the innermost portion of the cam path 50 and hence the units are in their outermost or gathering position. Further movement of the table in a direction indicated by the arrow, causes the roller 49 to pass outwardly of the center of the table in the cam path 50 to swing the head about the pivot 22 to the position indicated at B at which the mold is immediately over and associated with the bottom plate 59 and at which position the parison is to be formed by counterblowing. The relationship of the mold parts at the position B is as shown in Fig. 6. The bottom plate 59 has capped the parison mold 26 and together with that mold and the neck ring forms a completed mold. The neck pin 83, carried by the head 42, has been withdrawn and compressed air is being applied through the head, to force the glass against the mold walls and to form an enlarged cavity in the parison. The parts remain in this relative position and the counterblowing continues for a substantial portion of the cycle of rotation of the table 14. In Fig. 4, the parts are indicated as still in the parison forming position when they reach the position C. The formation of the parison should be substantially accomplished by the time the unit reaches this position C and thereafter, as the position D is approached, the cam 50 moves the roller 49 to cause movement of the parison mold head to the transfer position in advance of the bottom plate and out of alignment therewith, in order that the transfer may begin at the position marked D. As a result of this movement, the axes and pivots 25 of the parison and neck molds, are brought into radial alignment with the axes of the mold table to permit clearance of the blow mold by the parison mold during the transfer. The relationship of the mold parts in the transfer position is illustrated in Fig. 7. The parison mold 26 has been opened leaving the parison suspended from the neck ring 36 and the suspended parison is carried to the point of tangency of the paths of the center lines of the neck ring and blow mold. The blow mold 73 begins to close about the suspended parison at the point D and while closing, the blow mold is caused to travel radially of its table and to follow the path of the parison. Shortly after the unit has passed the position indicated at D, the transfer will have been completed, the neck ring having opened and the blow mold having closed. The blow mold is then again moved radially of its table and the final blowing of the parison is begun in the blow mold. After the transfer has been accomplished the open neck ring and parison mold are carried through a considerable portion of the cycle of the rotation of the table, as indicated by positions E and F, Fig. 4. During this portion of their travel, the mold parts are cooled by suitable means (not shown). At about the time the unit passes the position F, the roller 49 is moved inwardly toward the center of the table by the cam 50, to swing the unit to gathering position, the mold parts and neck ring are closed, the mold brought over the gathering pot 12 and dipped into the glass to effect a gather.

A preferable form of operation of the complete device above described is as follows:

The rotary tables 14 and 71 are continuously rotated by suitable means at suitable speed and in such phase relation that the cooperating neck rings and blow molds are positioned properly for the transfer of parisons to the blow molds. The successive units on the tables go successively through the same cycle of operation. Therefore, the cycle of but one set of units on each table will be considered.

Beginning at a point in the rotation of a particular parison mold unit about the center of its table, indicated by F on Fig. 4, at which the plate 18 is in a horizontal position and the blow mold and neck ring are open, the table 14 rotating in the direction indicated encounters suitable cams which actuate the pneumatic cylinders 31 and 41 to close the neck ring and body parison mold, as the unit approaches the gathering position. As the parison mold arrives over the bath of glass contained in the pot 12, the plate 18 is released from the latch 61 and the roll 19 following cam portion 21 permits the tilting of the plate 18 to dip the lower end of the parison mold into the glass. A vacuum is then established in the parison mold and neck ring, the head 42 being connected for this purpose to a suitable source of vacuum through the operation of suitable cam controlled mechanisms. As the mold passes through the glass in the furnace, it sucks up a suitable quantity of glass to form the mold charge, whereupon the head is lifted, as the roll 19 encounters the downward sloping portion of its cam 20. As the mold rises, it carries with it a connecting string of glass between the glass in the supply and that collected in the mold. The shears 52 are then projected to sever this string, and are then opened and retracted. The shears may be suitably cooled if desired, by any well-known means. When the charge has been collected and severed, the cam roller 49 and cam track 50 moves the closed parison mold, neck ring and the head 42 to a position directly above the bottom plate 59, (see positions B and C, Fig. 4 and Fig. 6) which plate is moved into capping relation with the bottom of the mold, to complete the parison mold. The parison is formed while the head is in this position, by forcing a pressing plunger downwardly through the neck ring, but preferably as shown in Fig. 6, by blowing compressed air therethrough. The glass is thus forced into intimate contact with a completed parison mold. The parison is thus formed prior to the arrival of the unit at the position indicated at D, Fig. 4, at which the transfer begins. As this position is approached, the parison mold is opened by the application of suitable air pressures in the cylinder 31 leaving the parison suspended from the closed neck ring and while so suspended is moved into the path of the center line of the associated blow mold (at point D, Fig. 4). The blow mold begins, at about this point, to close about the parison. While it is closing, the blow mold is moved radially of its table and caused to follow the path of rotation of the parison and neck ring. When the blow mold is completely closed, the neck ring opens and the transfer has been accomplished. The blow mold is then returned to its normal position on the table 71, and suitable blowing mechanism is applied thereto to blow the parison to final form. As indicated in Fig. 4, the blowing preferably continues throughout a major portion of the cycle of the blow mold. As the blow mold approaches the position L, it is opened and the finished article is removed manually or by automatic means.

My invention is not limited to the specific mechanism shown and described, but may be modified in many particulars within the spirit of my invention as set forth in the appended claims.

All of the claims herein are specifically limited to combinations including means for moving the parisons and/or neck ring with respect to the parison mold carrier or table into a transferring position, and I specifically reserve, for other copending applications, all other subject matter common to any of those applications and this application.

I claim:

1. In a glassware forming machine in combination, a parison mold carrier adapted to rotate about a center, and a blow mold carrier adapted to rotate about a different center, a parison mold mounted upon the first-named carrier, a blow mold mounted upon the second named carrier, a neck ring associated with the parison mold, means for creating vacuum in the cavities of the neck ring and parison mold, means for swinging the parison mold, neck ring and vacuum creating means as a unit relative to the parison mold carrier about a vertical axis to present the parison mold successively to a charge gathering position, a parison forming position and a parison transferring position, means for forming a parison, and means for transferring the parison so formed to the blow mold during the continued rotation of the parison mold carrier.

2. In a glassware forming apparatus, in combination, a container for glass, a suction gathering parison mold and neck ring therefor, a constantly rotating carrier upon which said parison mold and neck ring are mounted, means for moving the parison mold on its carrier to a projected gathering position, and for dipping it into the container, means for collecting a charge in the mold by suction, severing means for severing the charge, a bottom plate, means for moving the charged mold to a position above the bottom plate, means for forming a parison in the mold, bottom plate, and neck ring, means for opening the parison mold, and suspending the formed parison from the neck ring, means for moving the neck ring and suspended parison relative to the carrier to a transfer position, a blow mold, a carrier therefor adapted to rotate about a center other than that about which the parison mold rotates and to present the blow mold to receive the suspended parison, and means for closing the blow mold.

3. In combination with a bath of molten glass, a continuously rotating two-table glass fabricating machine, a blow mold mounted on one table, a parison mold and neck ring mounted on the other table, means for moving the parison mold about a vertical pivot fixed on said parison mold table to a projected position, means for dipping the parison mold while in such position into the glass bath, means for gathering a charge from said bath by suction into the parison mold, means for severing the charge so gathered, means for forming a parison in said parison mold, and means for transferring the parison so formed to the blow mold.

4. In a glassware fabricating apparatus, in combination, a gathering pool, a rotating table, a carrier mounted for oscillating movement upon the table, means for oscillating the carrier, an upwardly projecting pivot upon the carrier, a second carrier mounted for movement about the pivot, a parison mold and neck ring mounted upon said second carrier, means for opening and closing the parison mold and neck ring, means responsive to the rotation of the table to move the second carrier about its pivot to move the parison mold and neck ring into a projected position above the gathering pool, means for creating a vacuum within the mold and neck ring while in such projected position to collect a charge of glass in the mold, means for further shaping a parison from said charge, while the parison mold is in a less projected position relative to its table, and means for thereafter moving the second carrier to an intermediate projected position to present the formed parison at a transfer station, a blow mold at said station, and means for opening and closing the blow mold.

5. In combination with a supply of molten glass, a two-table suction gathering glassware fabricating machine, comprising a parison mold, neck ring and suction head mounted on one table for rotation about the center thereof, and a blow mold mounted on a second table for rotation about the center thereof, means for rotating the tables, means for gathering a charge of glass by suction in said parison mold and neck ring, means for further shaping the charge into a complete parison therein, means for opening the parison mold, leaving the parison suspended from the closed neck ring, means for moving the parison while so suspended into the path of the center line of the blow mold, means for closing the blow mold about the parison, means for opening the neck ring, and means for blowing the parison into final form in the blow mold.

6. In combination with a supply of molten glass, a fabricating machine for glassware comprising a continuously rotating suction parison mold carrier adapted to rotate about one center, a suction gathering parison mold mounted thereon, a blow mold carrier adapted to rotate about a second center, a blow mold mounted thereon, means for moving said parison mold relative to said carrier successively into gathering, parison forming, and transfer positions, means for creating a vacuum within the parison mold to gather glass charges therein, means for further shaping into completed parisons the charges so collected, and means for transferring the parisons so formed to the blow mold while the carriers rotate about their respective centers.

7. In combination with a glass gathering pot, a continuously rotating suction gathering and glassware forming machine, comprising a blow mold, means for opening and closing the blow mold, a pivot spaced from the axis of rotation of said machine, a parison mold and associated neck ring mounted for movement thereabout, a bottom plate, means for opening and closing the parison mold and neck ring, means for moving the parison mold and neck ring about said pivot to a projected position adjacent the gathering pool, then to a position adjacent the bottom plate and thereafter to a position adjacent the blow mold, means for gathering a charge by suction while the parison mold and neck ring are in the first named position, means for further shaping a parison in the mold and neck ring while they are in the second named position, and means for transferring the charge in neck-up position to a blow mold while the parison mold and neck ring are in the third named position.

8. In combination with a gathering pool, a glass fabricating machine comprising a rotary mold table, a support swingably mounted on said table, a parison mold unit including a body mold and neck mold mounted on said support, means for charging said mold from the surface of said pool by suction, a severing device and a bottom plate mounted in angularly spaced relation on said table, and means for oscillating said support to successively move the parison mold into radial alignment with the severing device and to hold the said mold in such alignment during the severing operation, and into vertical alignment with the bottom plate and to hold the mold in such alignment for engagement with the bottom plate during the rotation of the table.

9. In a glass forming apparatus, in combination, a container for glass, a suction gathering parison mold and neck ring therefor, a constantly rotating carrier upon which said parison mold and neck ring are mounted, means for moving the parison mold on its carrier to a projected gathering position, and for dipping it into the container, means for collecting a charge in the mold by suction, severing means for severing the charge, a bottom plate, means for permanently supporting said bottom plate in position for vertical alignment with the parison mold, means for moving the charged mold into vertical alignment with the bottom plate and for engaging the mold with the bottom plate, means for forming a parison in the mold, bottom plate and neck ring, means for opening the parison mold and suspending the formed parison from the neck ring, means for moving the neck ring and suspended parison relative to the carrier and to the bottom plate to a transfer position, such movement causing the parison to be moved outwardly with respect to the carrier, a blow mold, and means for transferring the parison to the blow mold.

Signed at Hartford, Connecticut this 14th day of January 1929.

KARL E. PEILER.

DISCLAIMER 1,823,123.—*Karl E. Peiler*, West Hartford, Conn. Two Table Glass Forming Machine. Patent dated September 15, 1931. Disclaimer filed July 11, 1932, by the patentee, assignee *Hartford-Empire Company*, concurring and consenting.

Hereby enters this disclaimer.

The petitioner disclaims any interpretation of the words "transfer position" in claim 6 which does not require that this position be radially fixed relative to the parison mold carrier, and which does not require that this position be the one at which the parison is finally released from all the mold parts which form it into a parison.

[*Official Gazette August 9, 1932.*]